United States Patent

[11] 3,548,929

[72] Inventor Frank R. Gross
     3926 Woodthrush Road, Akron, Ohio
     44313
[21] Appl. No. 869,441
[22] Filed Oct. 3, 1969
[45] Patented Dec. 22, 1970
     Continuation-in-part of application Ser. No.
     710,908, Mar. 6, 1968, now abandoned.

[54] HEAT-TRANSFER APPARATUS
     14 Claims, 11 Drawing Figs.
[52] U.S. Cl. .................................................. 165/89,
                                                         165/76
[51] Int. Cl. .................................................. F28f 7/00
[50] Field of Search ....................................... 165/86-
                        —89, 135; 201/157.3; 138/38—42

[56]              References Cited
            UNITED STATES PATENTS
2,875,985  3/1959  Huld ............................. 165/89
2,915,292  12/1959 Gross ............................ 165/89
3,080,150  3/1963  Gross ............................ 165/89X
3,218,799  11/1965 Lovingham ..................... 165/89X Primary Examiner—Robert A. O'Leary
Assistant Examiner—Theophil W. Streule
Attorney—Oldham and Oldham ABSTRACT: Heat exchange means as for processing rolls of the type including concentric outer and inner cylindrical shells defining therebetween an annular space for passage of flowable heat exchanging medium. Continuous partition strip or insert spirally arranged in annular space between shells is of composite structure permitting use of selectively variable materials to withstand chemical and thermal action by certain heat transfer fluids tending to erode, corrode, decompose, or otherwise destroy partitions or parts thereof made of rubberlike, elastic plastic materials heretofore used for this purpose.

PATENTED DEC 22 1970

INVENTOR.
Frank R. Gross
BY William Cleland
Attorney

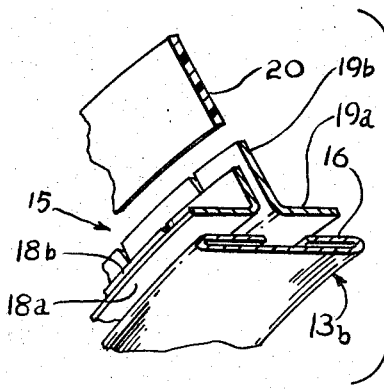
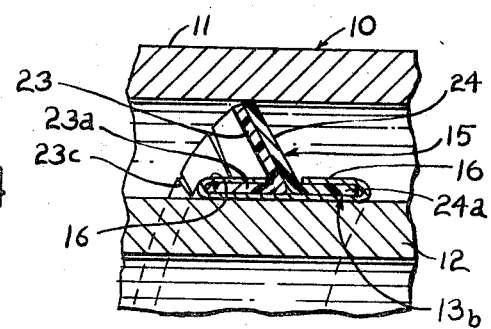
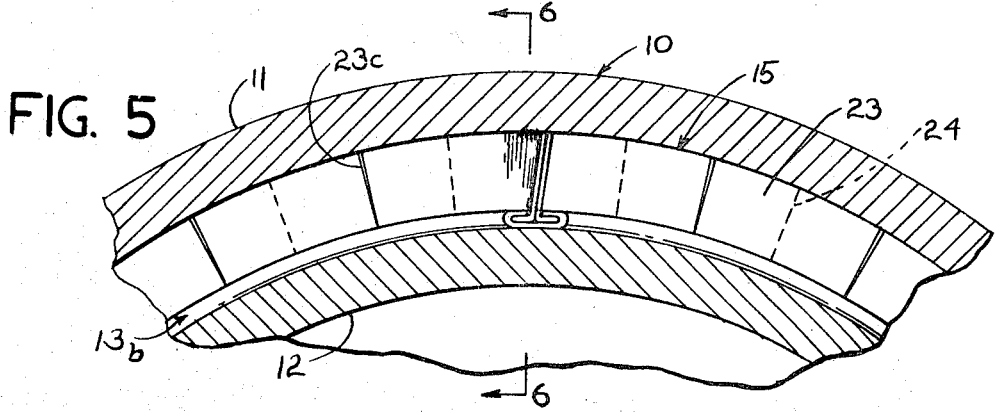
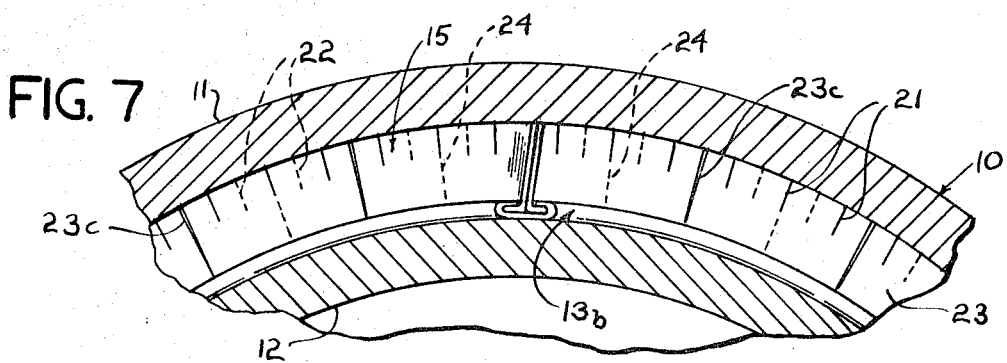
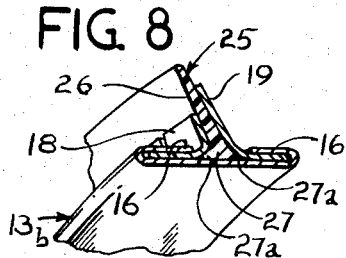
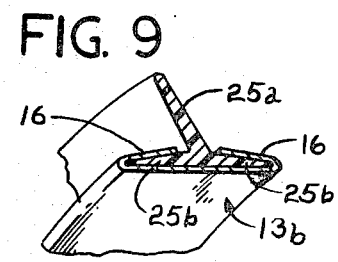
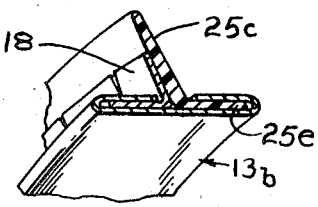
INVENTOR.
Frank R. Gross
BY William Cleland
Attorney INVENTOR
FRANK R. GROSS
BY:
*Oldham & Oldham*
ATTORNEYS

3,548,929

HEAT-TRANSFER APPARATUS

HEAT-TRANSFER APPARATUS

This application is a continuation-in-part of my prior application Ser. No. 710,908, filed Mar. 6, 1968, now abandoned.

BACKGROUND OF THE INVENTION

Prior F. R. Gross U.S. Pats. Nos. 3,080,150, 2,915,292 and 2,985,435 disclose constructions for facilitating the transfer of heat through heat-conducting walls of heat exchange apparatus, as for use in processing rolls having an annular passage therethrough between concentric cylindrical surfaces, and provided with a flexible, elastically-deformable, thin-tipped insert attached at a base thereof to extend in a spiral around one cylindrical surface, and to have a thin-tipped insert attached at a base thereof to extend in a spiral around one cylindrical surface, and to have a thin-tipped edge portion yieldingly deformably depressed against the other cylindrical surface. In the prior patented heat exchangers, however, the spiral partitions had somewhat limited use, primarily because portions necessarily made of rubber or rubberlike elastic material were subject to deterioration, due to chemical and thermal reactions, if exposed to certain heat-cooling fluids, such as oil. Spiral inserts when made of rigid or semirigid materials to avoid deterioration, were not considered practical because of problems in maintaining requisite fluid-tight contact between the tips of rigid partitions and the surface of the heat transfer wall, as well as the other problems experienced in bonding such materials to metal cylindrical wall.

SUMMARY OF INVENTION

The heat transfer roll of the present invention may include one cylindrical shell concentrically mounted in a larger shell as before, to define an annular heat-transfer space between radially spaced cylindrical walls thereof. A spiral heat-transfer partition, provided within the annular space, is designed for forcibly spiralling fluid heat-transfer medium at high velocity as the roll is rotated in use, also in known manner. To expand the field of use of the heat transfer roll, the spiral partition of the present invention is of composite structure utilizing interchangeable parts of selectively variable relatively rigid, inelastic materials adapted to withstand corrosive or other deteriorating actions of heat-transfer mediums passing through the annular space. This composite structure, for example, may include a metal base which is wound in a spiral about one said cylindrical wall surface and welded or otherwise bonded thereto, and adjustable means carried by the base for retaining a spiral blade of a different material, such as rigid plastic material, also adapted to withstand deteriorating action. The spiral blade, however, is sufficiently thin, or otherwise pliably constructed in the composite partition to permit yielding flexure of the tip of the blade against the other cylindrical wall surface. Thus, a very tight fluid seal is obtainable between the flexed spiral blade and the said other wall surface, for efficient and effective operation of the heat-transfer apparatus without necessarily using rubberlike elastic materials. The improved composite partition structure, however, makes possible the selective use of a wide variety of different material combinations, including an elastic pressure blade on a metal base. It is also possible to replace the pressure blade of requisite material in a previously installed spiral base therefor.

One object of the invention is to provide heat-exchange apparatus of the character described having an improved composite spiral partition which obviates the usual requirement that at least a sealing rib of the partition be of rubberlike elastic material.

Another object of the invention is to provide an improved composite spiral partition of the character described in which parts are economically interchangeable to suit particular requirements.

Other objects of the invention will be manifest from the following brief description and the accompanying drawings:

Of the accompanying drawings:

FIG. 4 is an exploded, fragmentary perspective view, corresponding to sectioned portions of the composite partition, as shown at the right of FIG. 2.

FIG. 5 is a fragmentary view corresponding to the upper portion of FIG. 3, and illustrating use of a modified form composite spiral partition, in accordance with the invention.

FIG. 6 is an enlarged cross section taken substantially on line 6–6 of FIG. 5.

FIG. 7 is a fragmentary view corresponding to FIG. 5, but showing use of another modified form of composite spiral partition.

8, FIGS. 8, 9, 10, and 11 are enlarged fragmentary cross sections, corresponding in part to FIG. 6, but showing three additional modified forms of composite spiral partitions of the invention, apart from the roll structure.

FIGS. 12 through 19 are enlarged cross-sectional views of additional modified forms of composite spiral partitions of the invention apart from the roll structure.

Figure 1:
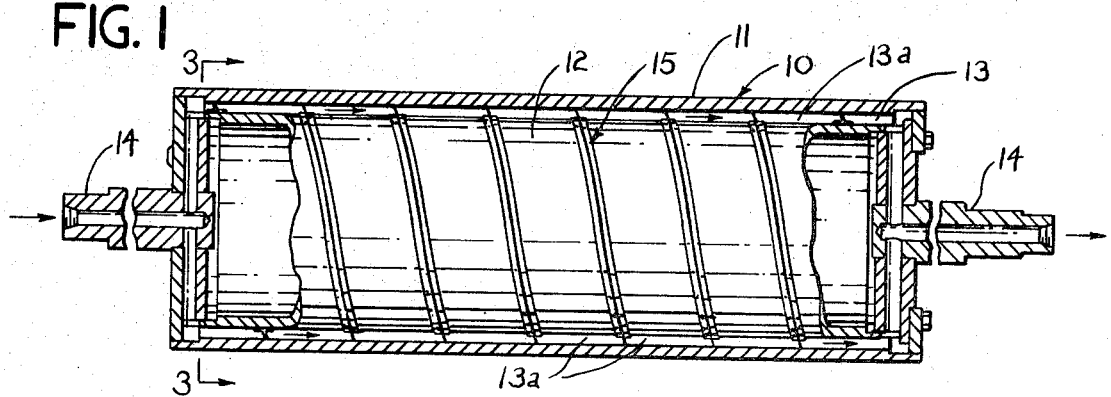
FIG. 1 is a sectional view partly broken away and in section, taken longitudinally through a roll structure having incorporated therein heat-transfer cooling means, and including one form of improved composite fluid-channeling, partition means of the present invention.

Referring generally to FIGS. 1 to 4, and to FIG. 1 in particular, there is illustrated a closed end cooling roll 10, including outer and inner cylindrical shells 11 and 12, defining therein an annular space 13 for passage of a fluid heat-exchange medium, under pressure, from one end of the annular space 13 to the other, as indicated by arrows in FIG. 1. The roll is provided with axially aligned, opposite end stub shafts 14, 14 for rotatably mounting the same in suitable frame means, not shown.

Mounted in the annular space 13 of the roll, to seal the same off into s spiral channel 13a for more effective and efficient movement of cooling medium, a spiral heat-transfer means or partition 15 is provided to seal the channel 13a. In order than any of various known heat-transfer mediums may be used without risk of the deterioration which occurs when sealing means of rubber or like elastic materials are used, the partition 15 may be a composite of several suitable materials, not necessarily including such elastic material.

To this end, the composite partition 15 may include a channel-shaped base portion of relatively rigid but flexible material not subject to erosive action of heat-transfer fluids, such as stainless steel or other metal, formed of substantially thin, generally flat cross section, to facilitate conformation and attachment to the cylindrical surface of the inner shell 12, as by welding or other strong bonding methods. Anchoringly gripped under the oppositely inturned flanges 16, 16 of base 13b, may be flanges 18a and 19a of continuous elements 18 and 19, respectively, of similar rigid but flexible material, to have radial flanges 18b and 19b extending radially, in spaced relation, with the spiral shape of the base, strongly to grip a thin, continuous blade 20 of semirigid plastic material. In addition, the invention contemplates that a rivet, or the like may preferably be used to hold or lock at least certain portions of the blade to the flanges 18b and 19b, such as rivet R illustrated in FIG. 11. Blade 20 may, for example, be of " Teflon" (product of E. I. duPont de Nemours & Co.), capable of withstanding the erosive action of heat-transfer fluids under certain conditions, and is anchored as described, yieldingly to maintain an outer or tip edge 20a of the same, in fluid-sealing engagement with the cylindrical wall of the outer shell 11. Tight sealing engagement of the blade tip 20a with the shell 11, as described, may be facilitated by mounting the blade, as described, to be at a substantial angle, such as 20 to 30°, with respect to a plane or planes normal to axis of the drum at any given point, in direction against the flow of the pressurized fluid passing through the spiral channel 13a (see FIG. 2). That is, with rotation of the roll in use, in known manner, the pressure of the heat-transfer medium decreases at as it passes through the roll. A pressure differential, therefore, exists at opposite sides of the blade which causes it to make intimate fluid-sealing contact with the outer shell 11.

In order to be able to assemble such a composite heat-exchange partition 15 composed of various materials, including inelastic materials, the base 13b may be helically wound and welded to the inner shell 12 while the latter is apart from the outer shell. The angle strips 18 and 19 are then readily inserted under the inturned flanges 16 of the base, initially more or less loosely, the radial flanges, respectively, being provided with a plurality of uniformly spaced radial cuts or slits 18c, to allow the strips as a whole to conform to the given spiral shape of the base 13b, preferably with the slits 18c of the opposed flanges in staggered relation, for maximum strong, yieldingly resilient support of the blade 20. For more firmly anchoring the spirally supported blade to the base, the base flanges 16 may be crimped against the flanges 18a and 19a, as best shown in FIGS. 2 and 3.

Figure 2:
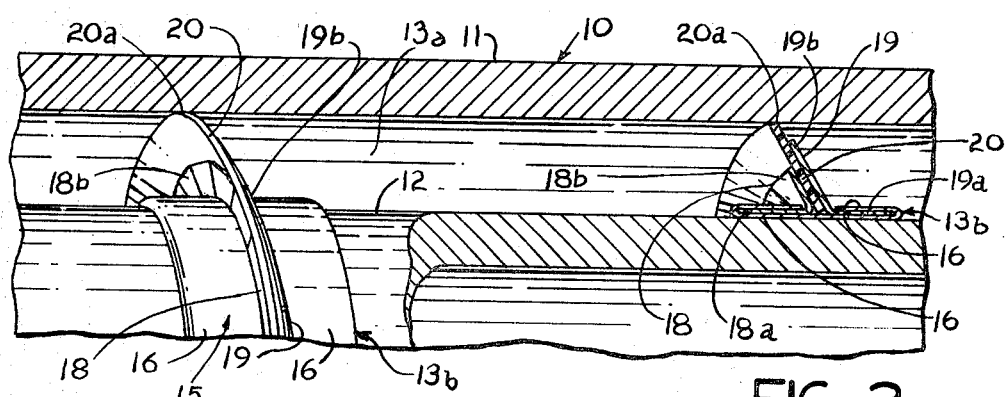
FIG. 2 is an enlarged fragmentary cross section corresponding to the upper right-hand portion of FIG. 1.
Figure 3:
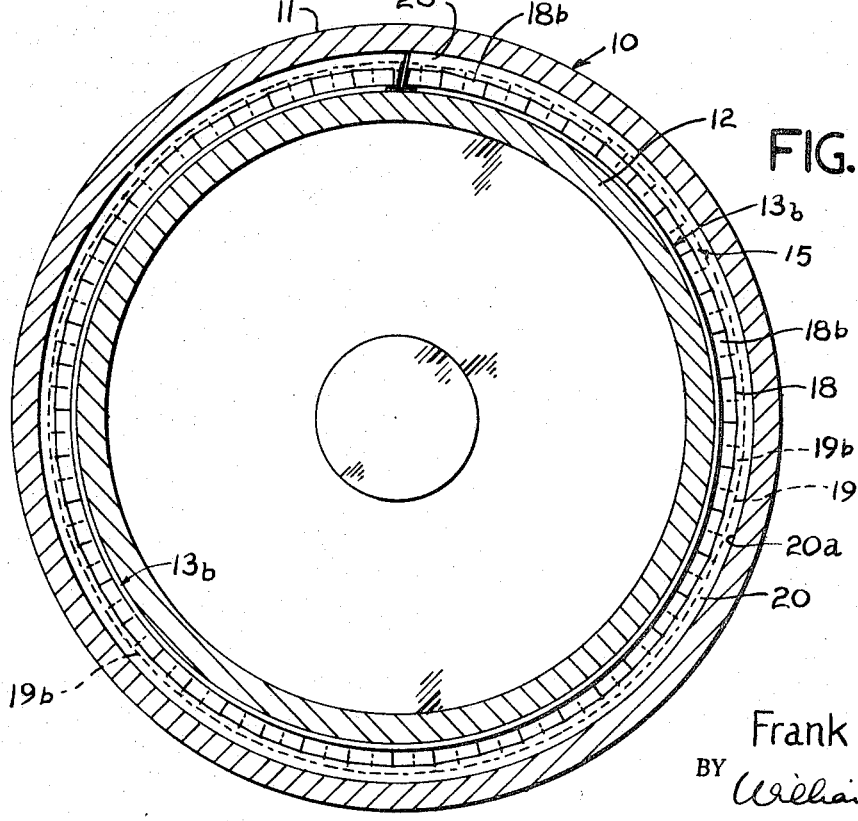
FIG. 3 is an enlarged vertical cross section taken substantially on the line 3–3 of FIG. 1.

After the blade 20 is in position, as described, the inner shell 12 is readily inserted within the outer shell 11, in the direction from left to right shown in FIGS. 1 and 2, and the ends of the roll are sealed by suitable end plates, as shown in FIG. 1.

Thus has been provided roll 10 provided with an efficient heat transfer means, as for heating or cooling paper, film, plastics, and other materials with, and in which selective use of different materials in the composite partition means 15 makes it possible to provide highly efficient and effective transfer means for cooling roll structures for a very wide range of uses requiring varying types of fluid heat-transfer mediums.

While it is an object of the present invention to provide roll structures with improved heat transfer partition means or inserts which are not subject to deterioration, it is readily apparent that the improved composite partition means 15 is versatile and capable of use with variable combinations of differing materials, according to particular requirements in each instance, without requiring expensive parts or equipment for a quick modification of all or part of the composite partition unit 15.

Certain synthetic plastic materials are difficult to bond directly to metals. Therefore, the composite spiral partition or insert 15 may have a base 13b capable of bonding to metal, anchoringly to support the other parts whether they are rigid, semirigid, or flexible.

FIGS. 5 and 6 illustrate use of a form of spiral partition member 15, including a pair of back-to-back blade parts 23 and 24, affixed in fluid-sealing engagement with the outer shell wall 11, as shown in FIG. 6, by angular, oppositely outturned flange extensions 23a and 24a, respectively, gripped by the inturned flanges 16 of the base 13b. To facilitate assembly of the angular blade parts 23 and 24, the same may be made in relatively short sections 23b and 24b peripherally of the base 13b, or of any suitable lengths which are insertable along the base from an end or ends thereof to form a continuous spiral of the same anchored to the base, but with joints 23c of segments on opposite sides staggered (see FIG. 5), to retain a fluid seal against passage of cooling fluid through the joints thereof. This modified structure otherwise functions in the manner of the structure described in connection with FIGS. 1 to 4.

FIG. 7 is a modification which is in all respects the same as described in connection with FIGS. 5 and 6, except that the back-to-back blades 23 and 24 have relatively short slits 21, 21 and 22, 22 respectively, in the outer fluid-sealing edges thereof, for greater flexibility where thicker or more rigid blades 23 and 24 are required.

FIG. 8 is a fragmentary perspective view of a modified form of spiral partition 15, shown apart from the cooling roll, which is in all respects like the partition unit exemplified in FIG. 7 except that the blade 25 is of extruded elastic or semirigid plastic material to have a tapered blade portion 26 and an enlarged inner end portion 27 defining protruding edges 27a, adapted to be locked under corresponding corner edges of the angle strips 18 and 19.

FIG. 9 is a view corresponding to FIG. 8, illustrating another modified partition structure wherein the angle strips 18 and 19 of FIG. 8 are eliminated, by forming the blade member 25a with a wide inner base, defining integral, oppositely outturned flanges 25b, 25b, which are gripped by the flange portions 16 of the base 13b.

FIG. 10 shows still another modification which has characteristics of the structures of both FIGS. 8 and 9, including the angle strip 18 of FIG. 8 supporting one side of the blade 25c and an opposite angular extension 25e of the partition blade 25c anchored under the correspondingly opposite flange of the base 13b.

Figure 11:
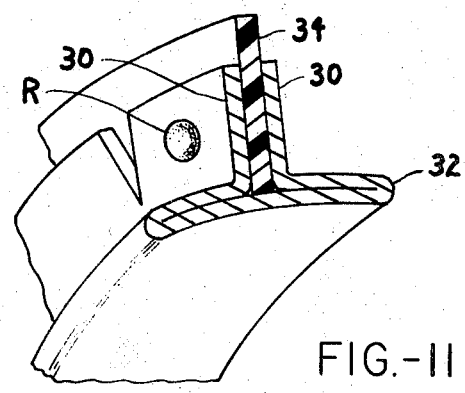
Figure 12:
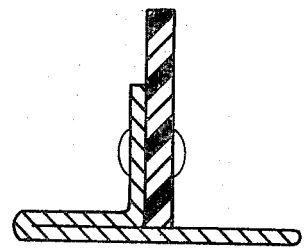
Figure 13:
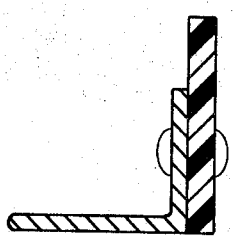
Figure 14:
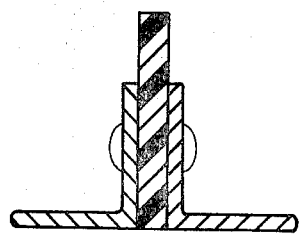
Figure 15:
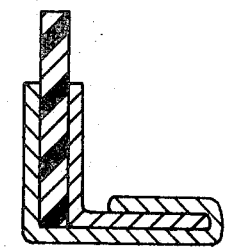
Figure 16:
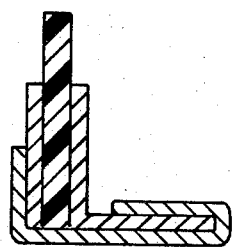
Figure 17:
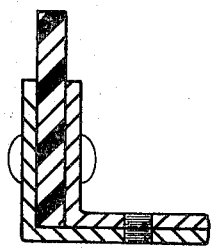
Figure 18:
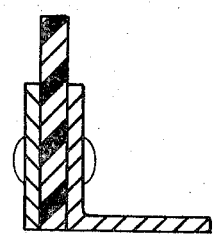
Figure 19:
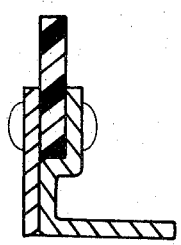

FIG. 11 shows still another modification which has characteristics of the embodiment of FIG. 6 except that the flanges 30 of the base 32 are bent to radially extending relationship so as to form opposed gripping surfaces for the blade 34. A rivet R is normally positioned at least at each end of the flanges 30 to securely hold the blade 34 in position.

In each of the structures of FIGS. 8 to 11, it is readily apparent they may be assembled on the inner shell 12 of the roll, as re previously described above for FIGS. 1 to 4, for example, and that the composite structure makes variations in materials and parts simple and economical to accomplish. The partition means 15 may be reversely affixed on the inner surface of the outer shell 11, if necessary, and working space is sufficient for installation purposes.

FIGS. 12 to 19 illustrate modified structural embodiments of the invention where only a base, blade and rivet to hold the blade to the flange of the base are provided. These modifications appear to be quite satisfactory from a structural standpoint and perhaps the least expensive from a cost standpoint. Naturally, the blade supporting flanges may be angled with respect to the base for the same reasons pointed out above.

The blade supporting flanges may be notched to facilitate necessary bending to the contour of the inner shell. Preferably, the blade is as thin as possible to still have sufficient stiffness and resilience so as to maintain a fluid sealing contact with the outer shell. The blade supporting flange also preferably has resilience and sufficient length to augment the resilient engagement of the tip of the blade to the inner shell. The base is preferably tack welded along its length to the inner shell in the desired position.

Other modifications of the invention may be resorted to without departing from the spirit thereof or the scope of the appended claims. As an example, in FIG. 10, the flange 25e of blade 25c and the member 18 may be oppositely disposed so that radial flange 18 supports the blade against pressure of the heat transfer medium, as previously described, and generally in the manner of radial supporting flange 19 in FIG. 8.

While in accordance with the Patent Statutes only the best known forms of the invention have been illustrated and described, it is to be understood that the invention is not limited thereto or thereby, but that various other forms could be made to meet the objects of the invention.

I claim:

1. A composite partition, as for combination with heat exchange apparatus including outer and inner cylindrical shells defining therebetween an annular space for passage of flowable heat-exchanging medium comprising: a base portion of flexible resilient material for spiral attachment to one said shell; an elongated blade having a tip edge; and gripping means for anchoringly attaching said blade to the base to extend as an entity therewith for resilient, fluid-sealing engagement of said tip edge of the blade with said outer shell when said composite partition is spirally arranged between said shells.

2. Apparatus as in claim 1, said means including oppositely inturned flange means on said base, and portions on the blade firmly gripped by said inturned flange means.

3. Apparatus as in claim 2, said base including a thin portion of relatively rigid but flexible material formed substantially flat in cross section to facilitate spiral flatwise attachment of the same to said one shell.

4. Apparatus as in claim 3, said means including at least one spirally conforming element having one edge portion engaged in the base channel under one said inturned flange portion engaging said blade to support the same toward said resilient fluid-sealing engagement of said tip edge of the blade with other said shell.

5. Apparatus as in claim 4, said radially out-turned flange portion presenting an edge thereof in spaced relation to said other shell, and having spaced radial cuts to facilitate conformation thereof spirally with said base.

6. Apparatus as in claim 5, wherein said means includes a second spirally conforming element having a flange portion engaged under the other inturned flange means of said base, and having a radially out-turned flange means supportingly engaging the opposite side of said blade.

7. Apparatus as in claim 6, wherein the out-turned flange means of said second conforming element extends closer to said other shell than the first-named spirally conforming element at the side of the blade opposite to the flow direction of the cooling medium, and is provided with spaced radial cuts to facilitate conformation thereof spirally with said base.

8. Apparatus as in claim 1, said base portion being generally channel-shaped to have oppositely inturned flange means, said blade having integral lateral extensions along the base end thereof, said gripping means including spirally extending elements having portions anchored under said oppositely inturned flange means and portions anchoringly engaging the respective said lateral extensions of the blade.

9. Apparatus as in claim 1, said base portion being generally channel-shaped to have oppositely inturned flange means, said blade having integral lateral extensions along the base end thereof, said means including spirally extending elements having portions anchored under said oppositely inturned flange means and portions anchoringly engaging the respective said lateral extensions of the blade; said means including radial portions of said lateral extensions, embracing opposite sides of said spiral blade tending yieldingly to retain the same at a given angle toward said resilient fluid-sealing engagement of said edge of the blade with the other said shell.

10. Apparatus as in claim 1, said means including oppositely inturned flange means on said base, and integral lateral extensions along opposite sides of said blade anchoringly received under the correspondingly opposite said inturn flange means.

11. Apparatus as in claim 1, said means including flange means on said base and portions on said blade gripped thereby, and a blade-supporting means anchored by said means and having radial flange means supporting said tip edge of said blade against the other said shell.

12. Heat-exchange apparatus comprising outer and inner shells defining therebetween a space for passage of flowable heat-exchange medium; and a continuous composite partition arranged within said space to define a tortuous channel for flow of the heat-exchange medium along the same; said composite partition including a base portion substantially spirally conformed and affixed to one of said shells, an elongated blade having a resilient tip edge, and means anchoringly attaching the blade to said base to extend therewith to resilient, fluid-sealing engagement of said edge of the blade with said other shell.

13. A composite partition for use with heat-exchange apparatus including outer and inner shells defining therebetween a substantially annular space for passage of flowable heat exchange medium comprising: a base portion of flexible resilient material affixed for spiral attachment to one of said shells, an elongated blade having a tipped edge; means for anchoringly attaching said blade to said base to extend therefrom for resilient, fluid-sealing engagement of said tip edge of the blade with said other shell when said composite partition is spirally arranged between said shells.

14. Heat exchange apparatus comprising the combination with structure including outer and inner cylindrical shells defining therebetween an annular space for passage of flowable heat-exchanging medium; and a continuous composite partition spirally arranged within said annular space to define a tortuous channel for flow of the heat-exchanging medium along the same; said composite partition including a base portion spirally conformed and attached to one said shell, an elongated blade having a thin resilient tip edge, and gripping means on said blade and said base for anchoringly attaching the blade on the base to extend as an entity spirally therewith to resilient, fluid-sealing engagement of said tip edge of the blade with said other shell.